United States Patent [19]

Soukup et al.

[11] Patent Number: 4,479,972

[45] Date of Patent: Oct. 30, 1984

[54] FLAVOR AND MOUTHFEEL CHARACTER IN FOODSTUFFS BY THE ADDITION OF BITTER PRINCIPLES

[75] Inventors: Robert J. Soukup; Thomas H. Parliment, both of New City, N.Y.

[73] Assignee: General Foods Corporation, White Plains, N.Y.

[21] Appl. No.: 394,035

[22] Filed: Jun. 30, 1982

[51] Int. Cl.³ .......................... A23L 2/38; A23L 1/04
[52] U.S. Cl. ................................... 426/536; 426/576; 426/590
[58] Field of Search ............... 426/590, 536, 576, 616, 426/650

[56] References Cited

U.S. PATENT DOCUMENTS

| | | | |
|---|---|---|---|
| 2,950,974 | 8/1960 | Smythe et al. | 99/106 |
| 4,031,265 | 6/1977 | Guadagni et al. | 426/599 |
| 4,133,903 | 1/1979 | Thiele et al. | 426/590 |
| 4,282,264 | 8/1981 | Magnolato | 426/599 |
| 4,296,139 | 10/1981 | Khan et al. | 426/536 |

OTHER PUBLICATIONS

Arctander, S., *Perfume and Flavor Chemicals (Aroma Chemicals)*, vol. II, published by Author, Montclair, N.J., 1969, #2309.

Charalambous, G., *The Analysis and Control of Less Desirable Flavors in Foods and Beverages,* Academic Press, 1980, pp. 171–199.

Nelson, P. E. et al., *Fruit and Vegetable Juice Processing Technology,* 3rd ed., AVI Publishing Co., Westport, Conn., 1980, pp. 83–96, 127–133, 137–143, 418–421, 425–435.

Berry, R. E. et al., "Flavor Studies of Nootkatone in Grapefruit Juice", *J. Food Science,* vol. 32, No. 1, 1967, pp. 75–78.

*Primary Examiner*—Raymond Jones
*Assistant Examiner*—Elizabeth C. Weimar
*Attorney, Agent, or Firm*—Thomas A. Marcoux; Joseph T. Harcarik; Daniel J. Donovan

[57] ABSTRACT

A process for enhancing the flavor impact and mouthfeel characteristics of foodstuffs, particularly citrus-flavored beverages and desserts, is disclosed which comprises adding an effective amount of a bittering agent selected from the group consisting of naringin, limonin, nomilin and combinations thereof.

17 Claims, No Drawings

FLAVOR AND MOUTHFEEL CHARACTER IN FOODSTUFFS BY THE ADDITION OF BITTER PRINCIPLES

TECHNICAL FIELD

The invention relates to foodstuffs and more particularly to the addition of certain chemical compounds or compositions which have been found to have utility in the alteration of flavor or mouthfeel characteristics of said foodstuffs.

BACKGROUND ART

In the food industry there is a constant demand for the production of additives, whether naturally occuring or synthetic, which are capable of imparting, supplementing or improving the flavor or mouthfeel characteristics of foodstuffs. It is common in some segments of the industry to add flavor agents to enhance or bring out a desirable characteristic in products and by so doing, render the product more desirable from a consumer preference standpoint.

The prior art discloses numerous examples where a bittering agent is added to a foodstuff, particularly a beverage such as a tonic water and/or bitter lemon. The emphasis in these patents tends to be centered on the replacement of quinine which has typically been the agent responsible for producing the bitter taste in soft drinks. Representative of these patents is U.S. Pat. No. 4,296,139 issued to Khan et al. which teaches a method of bittering a foodstuff by adding a new chlorinated sucrose derivitive, 2,6,1' 6'-tetrachloro-2,6,1', 6',-tetradeoxymannosucrose which is utilized as a bittering agent to replace quinine sulphate. U.S. Pat. No. 4,133,903 issued to Thiele et al. teaches the production of a bitter beverage which contains cynaropicrin in a concentration of at least 2.5 milligrams per liter.

The citrus industry has for a long time recognized bitterness as an undesirable flavor property and has sought to develop new breeds of citrus products which were developed to selectively breed out or reduce bitterness. The following 3 patents are of interest in illustrating the desirability of removing bitterness from beverages (U.S. Pat. No. 2,950,974 issued to Smythe et al., U.S. Pat. No. 4,031,265 issued to Guadagni et al., and U.S. Pat. No. 4,282,264 issued to Magnolato.) The main bitter agents in citrus products have been identified as being either limonin or the flavanone glycoside, naringin or a combination of the two.

DISCLOSURE OF INVENTION

The invention relates to the addition of a citrus bittering agent to a foodstuff in an amount effective to impart to said foodstuff an enhanced natural flavor impact and an improved mouthfeel character. The bittering agent is selected from the group consisting of limonin, nomilin and naringin and combinations thereof. The citrus bittering agents are added at approximately their threshold level. The present invention finds its greatest application in citrus-flavored beverages, particularly dry beverage mixes and in citrus-flavored desserts particularly gelatin desserts.

All three of the above mentioned bitter constituents are nonvolatile, bitter components found in citrus fruits. Limonin is a known intensely bitter compound which is recognized as being the main bitter principle of orange juice. Limonin has a dilactone structure and has been isolated from seeds and peel. Nomilin is structurally related to limonin in that they both belong to the limonoid group. The use level of these ingredients vary from 0.1 to 10 parts per million (ppm) on an as-consumed basis, preferably from 0.5 to 2.5 ppm. Naringin is the main bitter principle of grapefruit where it has been found in the albedo layer and in the carpellary membranes. The effective level of naringin varies from 2.5 to 50 ppm on an as-consumed basis, preferably from 5 to 25 ppm. It must be kept in mind that the level of incorporation will vary from foodstuff to foodstuff because variation in the foodstuff base (presence or absence of sugar, buffer, etc.) to which the bittering agent will be added will affect the threshold level and thereby the level at which the agent will produce its beneficial effect.

As is known to those skilled in the art, subthreshold levels of limonin, nomilin and naringin are additive. Therefore in addition to adding merely one of the specific bittering agents, it is possible to achieve improved flavor and mouthfeel character in foodstuffs by adding a combination of two of the agents or by adding all three. When adding combinations, the total level of the bittering agents will vary between 0.1 to 50 ppm on an as-consumed basis, preferably from 0.5 to 25 ppm.

The beneficial results obtained by the addition of the low level of bittering agents are unexpected and surprising when viewed against the teachings of the art. The citrus industry has identified the three specific bittering agents of the invention to possess an undesirable flavor property of intense bitterness and have attempted to develop processes to remove these agents. These processes include enzymatic conversion of naringin and limonin; the addition of neodiosmin, a substance which suppresses the perception of bitterness; and contacting citrus juice with an adsorbent (desugared carob particles) and then collecting the debittered juice. All of these processes seek to remove the bitterness from citrus juices or seek to prevent bitterness formation. The achievement of the beneficial result of an improved flavor and mouthfeel character when low levels of one of these citrus bittering agents is added to a foodstuff is a surprising finding in view of these teachings, all of which seek the removal of these intensely bitter, undesirable agents.

The flavor modifying and mouthfeel enhancing characteristics of the previously mentioned citrus bittering agents are all the more surprising when viewed against their known threshold levels. While a good deal of variability has been reported in the literature, it is generally accepted that naringin in water has a threshold level of 20 ppm and limonin and nomilin have a threshold of 1 ppm. In work dealing with limonin threshold levels it was found that in an aqueous solution containing a sweetener, the threshold level was found to increase. For example, at a 5% sucrose equivilant, the limonin threshold was 1.2 ppm when sucrose was utilized as the sweetener. At the 10% sucrose level, the bitterness threshold of limonin was 2.7 ppm as compared to the 1.0 ppm in water alone. It has also been reported that there is an 8 fold increase in the threshold level when as little as 0.6% citric acid is present in a liquid system at pH 3.5. This was hypothesised to be as a result of bitterness suppresion.

The present inventors during their investigation utilizing an citrus-flavored dry beverage mix found that the optimized level of limonin which increased both the flavor impact and mouthfeel character was 1.25 ppm. In a dry beverage mix system, there is present in excess of 10% sucrose on an as-consumed basis and additionally there is present a buffer system. In such a beverage system, an amount of 1.25 ppm of limonin borders very closely upon the perceived threshold level. Therefore the observed beneficial effects are not attributable to the known bitter taste of the limonin.

The present inventors also tested other known bitter producing agents in a citrus-flavored, dry beverage mix and found them to be unable to produce the beneficial results which were attributable to the naringin, nomilin and limonin. Table 1 illustrates the results of adding certain levels of known bittering agents to the dry beverage mix control.

TABLE 1

| Bitter Agent | Level of Incorporation (as-consumed basis) | Result Obtained (compared to control) |
|---|---|---|
| Quinine (Monohydrochloride or dihydrate) | 3 ppm | lower flavor impact; no bitterness |
|  | 4 ppm | increased flavor loss; no bitterness |
| Caffeine | 100 ppm | lower flavor impact; no bitterness |
|  | 200 ppm | low flavor and low bitterness |
| Triethyl Citrate | 20 ppm | no significant difference |
|  | 40 ppm | flavor appears slightly unbalanced; slightly more astringent |
| Sucrose Octa Acetate | 5 ppm | lower flavor impact; no bitterness |
|  | 10 ppm | too bitter |
| Quebracho | 50 ppm | lower flavor impact; no bitterness |

The results reported in Table 1 indicate that for the majority of the compounds, a lower flavor impact is observed and for all of the bitter agents no beneficial result was achieved. In comparison, when 17.5 ppm of naringin was added in the same study to the same citrus-flavored, dry beverage mix, a more rounded, juice-type, beverage was produced which was judged to be better than the control. At the 35 ppm level of incorporation, the result was that the flavor was more rounded, juice-type, the flavor was judged to be better than the control, but at this level there was a detrimental low, late bitter effect, thus making this level too high for utilization in this particular beverage system.

The following examples are provided as illustrations of the preparation and application of the flavoring composition of this invention.

EXAMPLE I

A dispersible limonin was prepared for use in an aqueous solution. This is necessary because limonin, while it is a white crytalline solid, is not readily soluble in an aqueous solution. Pure crystalline limonin was milled under liquid nitrogen at a ratio of one part limonin with three parts sucrose using a Spex TM mill. This was then blended with 195 parts of 10 DE Frodex, an appropriate amount of water and the resulting mixture was spray dried. The white solid which was obtained after spray drying is instantly soluble in water.

This material was added to a ready to drink, non-carbonated, lemonade flavor drink. The limonin was present at a level of 1.2 ppm (on an as-consumed basis). A panel of trained taste experts observed that the addition of limonin functioned to "marry" certain components of the beverage which were previously portrayed as separate flavor impressions thereby producing an enhanced flavor impact which was described as a jucier taste. The limonin also helped to provide enhanced body and mouthfeel effects to the beverage.

The spray dried limonin was also added to a lemon-flavored gelatin dessert such that the limonin was present at a level of 0.5 ppm and 1 ppm in the dessert on an as-consumed basis. The presence of the limonin enhanced the dessert by giving it a fuller mouthfeel and more juice flavor notes. The taste panel preferred the results obtained at the 0.5 ppm level.

EXAMPLE II

In a similar manner as was mentioned in Example I, a spray-dried form of nomilin was prepared and was incorporated into an orange-flavored, dry beverage mix producing the following levels of incorporation in parts per million on an as-consumed basis. For each level of incorporation a trained taste panel evaluated the mixture as compared to the beverage control and arrived at the following conclusions.

| ppm nomilin | Comments |
|---|---|
| 0.25 | Too low; No difference. |
| .50 | Very slightly bitter; better balanced. |
| 1.25 | Well balanced, positive effect; Slightly bitter. |
| 2.50 | Well balanced; positive effect; Slightly bitter. |
| 5.0 | Strong delayed bitterness. |

The test panel concluded that a use level of 0.5 to 2.5 ppm nomilin on an as-consumed basis contributed a positive effect to the orange-flavored beverage mix by increasing the flavor impact and improving mouthfeel character.

EXAMPLE III

Commercially available naringin was spray-dried in a similar manner as described in Example I producing a 20% naringin in a dextrin base. This form of naringin is readily soluble and dispersible in an aqueous solution.

An orange-flavored, dry beverage mix and an orange-flavored gelatin dessert were prepared containing 11 ppm of naringin on an as-consumed basis. The result was that both products exhibited an enhanced flavor and improved mouthfeel. The orange flavored beverage mix was tested against the orange beverage mix control in an 80 judgement preference test with the result that 59% of those tested preferred the beverage supplemented with the naringin. The supplemented beverage was said to have a more natural orange flavor, more natural character and impact.

EXAMPLE IV

An orange-flavored, dry beverage mix was prepared which contained a mixture of the citrus bitter principles of this invention. Specifically, the beverage when reconstituted contained 5 ppm of naringin and 0.6 ppm limonin on an as-consumed basis. The spray-dried form of these compounds were used. The combination provided a well balanced, more enhanced natural flavor impact and improved mouthfeel character as compared to the untreated sample.

We claim:

1. A method of producing an enhanced flavor impact and an improved mouthfeel character in a lemon-flavored, lemonade-flavored, or orange-flavored foodstuff comprising the addition of a citrus bittering agent selected from the group consisting of limonin, nomilin, naringin and combinations thereof in an amount of from 0.1 ppm to 50 ppm on an as-consumed basis.

2. The method of claim 1 wherein the efffective amount is from 0.5 to 25 ppm on an as-consumed basis.

3. The method of claim 1 wherein said bittering agent is limonin or nomilin and the effective amount is from 0.1 to 10 parts per million (ppm) on an as-consumed basis.

4. The method of claim 3 wherein the effective amount is from 0.5 to 2.5 ppm on an as-consumed basis.

5. The method of claim 1 wherein said bittering agent is naringin and the effective amount is from 2.5 to 50 ppm on an as-consumed basis.

6. The method of claim 5 wherein the effective amount is from 5 to 25 ppm on an as-consumed basis.

7. The method of claims 3 or 5 wherein said foodstuff is a beverage.

8. The method of claims 3 or 5 wherein said foodstuff is a dry beverage mix which exhibits said enhanced flavor impact and improved mouthfeel character upon reconstitution.

9. The method of claims 3 or 5 wherein said foodstuff is a dessert.

10. The method of claim 9 wherein said dessert is a gelatin dessert.

11. A lemon flavored, lemonade-flavored or orange-flavored foodstuff selected from the group consisting of powdered beverages mixes and desserts containing a citrus bittering agent in an amount of from 0.1 ppm to of 50 ppm on an as-consumed basis effective to produce an enhanced flavor impact and improved mouthfeel character in the foodstuff when it is in a reconstituted form and insufficient to create a perception of bitterness, said citrus bittering agent being selected from the group consisting of limonin, nomilin, naringin and combinations thereof.

12. The foodstuff of claim 11 wherein the effective amount is from 0.5 to 25 ppm on an as-consumed basis.

13. The foodstuff of claim 11 wherein said bittering agent is limonin or nomilin and the effective amount is from 0.1 to 10 parts per million on an as-consumed basis.

14. The foodstuff of claim 13 wherein the effective amount is from 0.5 to 2.5 parts per million on an as-consumed basis.

15. The foodstuff of claim 11 wherein said bittering agent is naringin and the effective amount is from 2.5 to 50 ppm on an as-consumed basis.

16. The foodstuff of claim 15 wherein the effective amount is from 5 to 25 ppm on an as-consumed basis.

17. The foodstuff of claim 11 wherein said dessert is a gelatin dessert.

* * * * *